2,951,102

CHLOROFLUOROMETHYLFLUOROFORM

Eric R. Larsen and Robert P. Ruh, Midland, Mich., assignors to the Dow Chemical Company, Midland, Mich., a corporation of Delaware No Drawing. Filed Apr. 30, 1958, Ser. No. 731,894

3 Claims. (Cl. 260—653)

This invention relates to a novel fluorinated organic compound, chlorofluoromethylfluoroform, having the structure:

$$CF_3CHClF$$

This compound has indicated utility as an anesthetic by virtue of extensive animal testing and limited clinical testing.

Preparation of chlorofluoromethylfluoroform is readily accomplished by the vapor phase fluorination of $CF_2BrCHClF$ using a chromium oxyfluoride catalyst at an elevated temperature and for a contact time in excess of one-half second. Specifically, the compound may be prepared by the following procedure:

Example

The fluorination of $CF_2BrCHClF$ was carried out by passing a vapor-phase mixture of HF and $CF_2BrCHClF$ upward through a vertical nickel reaction tube containing a ¾ inch by 24 inch bed of chromium oxyfluoride catalyst. (See U.S. Patent 2,745,886.) The fluorination reaction was carried out at a temperature of 350° C. for a period of 2 hours and 24 minutes. During this time a total of 23.3 moles of HF and 3.0 moles of $CF_2BrCHClF$ was passed through the reactor. This represents a molar ratio of 7.7 and a contact time of 1.2 seconds. Upon separating the product by fractional distillation, 0.78 mole of $CF_3CHClF$ was recovered. This represents a conversion of 26 percent.

While a temperature of 350° C. is shown in the above example, other temperatures between 200° C. and the temperature at which substantial decomposition of the reactants or reaction products occur may be employed. The mole ratio of hydrogen fluoride to organic is preferably at least 2:1, but may be as high as 15:1. The chlorofluoromethylfluoroform thus produced is a gas having a boiling point between −12 to −8° C. The gas appears to be non-explosive and non-flammable in oxygen at concentrations from 200:1 to 2.0:1 oxygen to organic ratio.

Fourteen (14) liters of chlorofluoromethylfluoroform were mixed with 14 liters of oxygen and a 12 kilogram male dog forced to breathe this mixture. In 5 minutes, complete surgical anethesia was achieved with a minimum amount of struggle and excitement. Anesthesia was maintained by causing breathing of this mixture for about 8 minutes. An electrocardiogram showed no abnormalities of heart rhythm before 2 micrograms per kilogram of epinephrine was injected intravenously and after the epinephrine injection, there was only an occasional auriculoventricular block and no ventricular extrasystoles. The mask was removed and in 1 minute, the dog held his head up and wagged his tail. After 2 minutes it appeared that the dog was well recovered. After 3 minutes the dog stood up and walked easily about. There was no vomiting, defecation, excitement or unusual salivation noted at any time during the test.

Samples of the mixture were administered to a series of humans who found it to be pleasant in odor and relatively powerful in analgesic and anesthetic effect.

In view of the above experiment, and others which duplicate the above results, in view of the non-explosive and non-flammable characteristics of the compound, and in view of the compound's base stability, chlorofluoromethylfluoroform indicates utility as an anesthetic material. It may be administered in the conventional method of administration of anesthesia, in a closed circuit system and in a to-and-fro anesthetic application.

Various modifications may be made in the compound of the present invention without departing from the spirit or scope thereof, and it is to be understood that we limit ourselves only as defined in the appended claims.

We claim:

1. Chlorofluoromethylfluoroform.

2. A method of preparing chlorofluoromethylfluoroform which comprises: passing a mixture of hydrogen fluoride and $CF_2BrCHClF$ through a chromium oxyfluoride catalyst in a reaction zone maintained at a temperature between 200° C. and the decomposition temperature of the reactants and reaction products and separating chlorofluoromethylfluoroform from the reaction mixture.

3. A method of preparing chlorofluoromethylfluoroform which comprises: passing a mixture of hydrogen fluoride and $CF_2BrCHClF$ through a chromium oxyfluoride catalyst in a reaction zone maintained at a temperature between 350° C. and the decomposition temperature of the reactants and reaction products and separating chlorofluoromethylfluoroform from the reaction mixture.

References Cited in the file of this patent

UNITED STATES PATENTS

| 2,576,823 | Benning et al. | Nov. 27, 1951 |
| 2,745,886 | Ruh et al. | Jan. 31, 1955 |
| 2,849,502 | Suckling et al. | Aug. 26, 1958 |

FOREIGN PATENTS

| 767,779 | Great Britain | Feb. 6, 1957 |

OTHER REFERENCES

Simons: "Fluorine Chemistry," vol. II, Academic Press Inc., New York, 1954, p. 272.